United States Patent [19]
Mc Coy

[11] Patent Number: 6,014,794
[45] Date of Patent: Jan. 18, 2000

[54] REINFORCED BUNGEE CORD TIE DOWN

[76] Inventor: Patrick M. Mc Coy, 940 Meadow Oak Dr., Monticello, Minn. 55362

[21] Appl. No.: 09/276,110

[22] Filed: Mar. 25, 1999

[51] Int. Cl.[7] .............................. A44B 13/00; B65D 63/10
[52] U.S. Cl. ............................ 24/300; 24/343; 24/265 H; 24/68 CD
[58] Field of Search ................ 24/298, 300, 301, 24/343, 265 CD, 265 EC, 265 H, 3.11, 3.12, 3.13, 131 C, 68 CD, 68 AS, 369; 267/74; 280/480

[56] References Cited

U.S. PATENT DOCUMENTS

| | | | |
|---|---|---|---|
| 2,991,524 | 7/1961 | Dobrikin | 24/371 |
| 3,751,772 | 8/1973 | Grandjanny | 24/115 A |
| 3,931,656 | 1/1976 | Thomas | 267/69 X |
| 4,432,121 | 2/1984 | Dupre | 24/343 |
| 4,694,541 | 9/1987 | Skyba | 24/301 |
| 5,113,981 | 5/1992 | Lantz | 267/74 X |
| 5,308,101 | 5/1994 | Monty | 280/480 X |
| 5,383,259 | 1/1995 | McIntire | 24/300 |
| 5,402,557 | 4/1995 | Dalen | 24/68 CD |

*Primary Examiner*—James R. Brittain
*Assistant Examiner*—Robert J. Sandy

[57] ABSTRACT

A reinforced bungee cord tie down for securing cargo without becoming over-stretched. The reinforced bungee cord tie down includes an elongate elastic member with each of the ends of the elastic member having a hook coupled thereto. The ends of an elongate inelastic flexible member are coupled to the ends of the elastic member such that the flexible member extends between the ends of the elastic member. The length of the flexible member is greater than the length of the elastic member when in a relaxed state and less than the length of the elastic member when in a fully stretched state.

6 Claims, 2 Drawing Sheets

REINFORCED BUNGEE CORD TIE DOWN

BACKGROUND OF THE INVENTION

1. Field of the Invention

The present invention relates to elastic tie downs and more particularly pertains to a new reinforced bungee cord tie down for securing cargo without becoming over-stretched.

2. Description of the Prior Art

The use of elastic tie downs is known in the prior art. More specifically, elastic tie downs heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,754,531; U.S. Pat. No. 4,694,541; U.S. Pat. No. 4,769,875; U.S. Pat. No. 2,991,524; U.S. Pat. No. 3,231,950; and U.S. Pat. No. Des. 287,099.

While these devices fulfill their respective, particular objectives and requirements, the aforementioned patents do not disclose a new reinforced bungee cord tie down. The inventive device includes an elongate elastic member with each of the ends of the elastic member having a hook coupled thereto. The ends of an elongate inelastic flexible member are coupled to the ends of the elastic member such that the flexible member extends between the ends of the elastic member. The length of the flexible member is greater than the length of the elastic member when in a relaxed state and less than the length of the elastic member when in a fully stretched state.

In these respects, the reinforced bungee cord tie down according to the present invention substantially departs from the conventional concepts and designs of the prior art, and in so doing provides an apparatus primarily developed for the purpose of securing cargo without becoming over-stretched.

SUMMARY OF THE INVENTION

In view of the foregoing disadvantages inherent in the known types of elastic tie downs now present in the prior art, the present invention provides a new reinforced bungee cord tie down construction wherein the same can be utilized for securing cargo without becoming over-stretched.

The general purpose of the present invention, which will be described subsequently in greater detail, is to provide a new reinforced bungee cord tie down apparatus and method which has many of the advantages of the elastic tie downs mentioned heretofore and many novel features that result in a new reinforced bungee cord tie down which is not anticipated, rendered obvious, suggested, or even implied by any of the prior art elastic tie downs, either alone or in any combination thereof.

To attain this, the present invention generally comprises an elongate elastic member with each of the ends of the elastic member having a hook coupled thereto. The ends of an elongate inelastic flexible member are coupled to the ends of the elastic member such that the flexible member extends between the ends of the elastic member. The length of the flexible member is greater than the length of the elastic member when in a relaxed state and less than the length of the elastic member when in a fully stretched state.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new reinforced bungee cord tie down apparatus and method which has many of the advantages of the elastic tie downs mentioned heretofore and many novel features that result in a new reinforced bungee cord tie down which is not anticipated, rendered obvious, suggested, or even implied by any of the prior art elastic tie downs, either alone or in any combination thereof.

It is another object of the present invention to provide a new reinforced bungee cord tie down which may be easily and efficiently manufactured and marketed.

It is a further object of the present invention to provide a new reinforced bungee cord tie down which is of a durable and reliable construction.

An even further object of the present invention is to provide a new reinforced bungee cord tie down which is susceptible of a low cost of manufacture with regard to both materials and labor, and which accordingly is then susceptible of low prices of sale to the consuming public, thereby making such reinforced bungee cord tie down economically available to the buying public.

Still yet another object of the present invention is to provide a new reinforced bungee cord tie down which provides in the apparatuses and methods of the prior art some of the advantages thereof, while simultaneously overcoming some of the disadvantages normally associated therewith.

Still another object of the present invention is to provide a new reinforced bungee cord tie down for securing cargo without becoming over-stretched.

Yet another object of the present invention is to provide a new reinforced bungee cord tie down which includes an elongate elastic member with each of the ends of the elastic member having a hook coupled thereto. The ends of an elongate inelastic flexible member are coupled to the ends of the elastic member such that the flexible member extends between the ends of the elastic member. The length of the flexible member is greater than the length of the elastic member when in a relaxed state and less than the length of the elastic member when in a fully stretched state.

Still yet another object of the present invention is to provide a new reinforced bungee cord tie down that helps control the force pulling on the hooks so that should the cord slide or either of the hooks become unhooked, the risk of injury is greatly minimized.

Even still another object of the present invention is to provide a new reinforced bungee cord tie down that helps resist breakage for a longer time than prior art bungee cord tie downs.

Still yet another object of the present invention is to provide a new reinforced bungee cord tie down that functions the same a traditional prior art bungee cord tie downs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
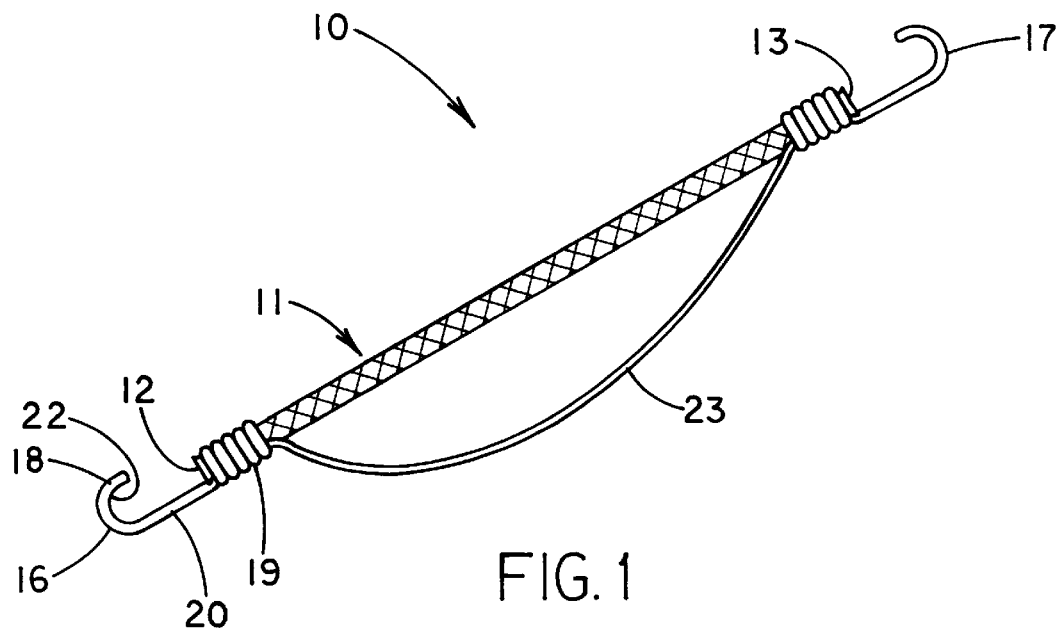
FIG. 1 is a schematic side view of a new reinforced bungee cord tie down with the elastic member in the relaxed state and the flexible member slack according to the present invention.

With reference now to the drawings, and in particular to FIGS. 1 through 4 thereof, a new reinforced bungee cord tie down embodying the principles and concepts of the present invention and generally designated by the reference numeral 10 will be described.

As best illustrated in FIGS. 1 through 4, the reinforced bungee cord tie down 10 generally comprises an elongate elastic member with each of the ends of the elastic member having a hook coupled thereto. The ends of an elongate inelastic flexible member are coupled to the ends of the elastic member such that the flexible member extends between the ends of the elastic member. The length of the flexible member is greater than the length of the elastic member when in a relaxed state and less than the length of the elastic member when in a fully stretched state.

Figure 4:
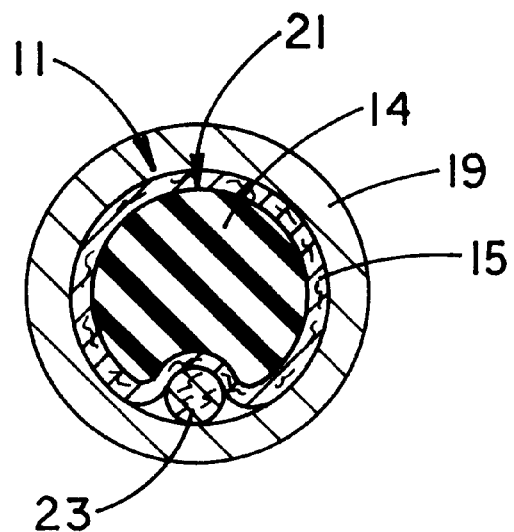
FIG. 4 is a schematic transverse cross sectional view taken from line 4—4 of FIG. 3 of the end region illustrated in FIG. 3.

In closer detail, the reinforced bungee cord tie down 10 comprises an elongate elastic member (or main cord) 11 having a pair of opposite ends 12, 13 and a longitudinal axis extending between the ends of the elastic member. With reference to FIG. 4, preferably, the elastic member has a generally circular transverse cross section taken substantially perpendicular to the longitudinal axis of the elastic member. In this preferred embodiment, the elastic member comprises a bungee cord having an elongate elastic core 14 and an elongate elastic sheath 15 disposed about the elastic core to substantially cover the elastic core between the ends of the elastic member.

The elastic member has a length defined between the ends of the elastic member. The elastic member has a relaxed stated (see FIG. 1) from which the elastic member may be stretched to a stretched state. The stretched state is defined at the point where the elastic member cannot be stretched further without breaking. The elastic member has a first length when in the relaxed state and a second length greater than the first length when in the stretched state.

Each of the ends of the elastic member has a hook 16, 17 coupled thereto and outwardly extending therefrom for permitting attachment of the ends of the elastic member to objects by hooking thereon with the hooks. Each of the hooks preferably has an arcuate end portion 18, a resilient coiled portion 19 and an elongate middle portion 20 connecting the end portion to the coiled portion of the respective hook.

Figure 3:
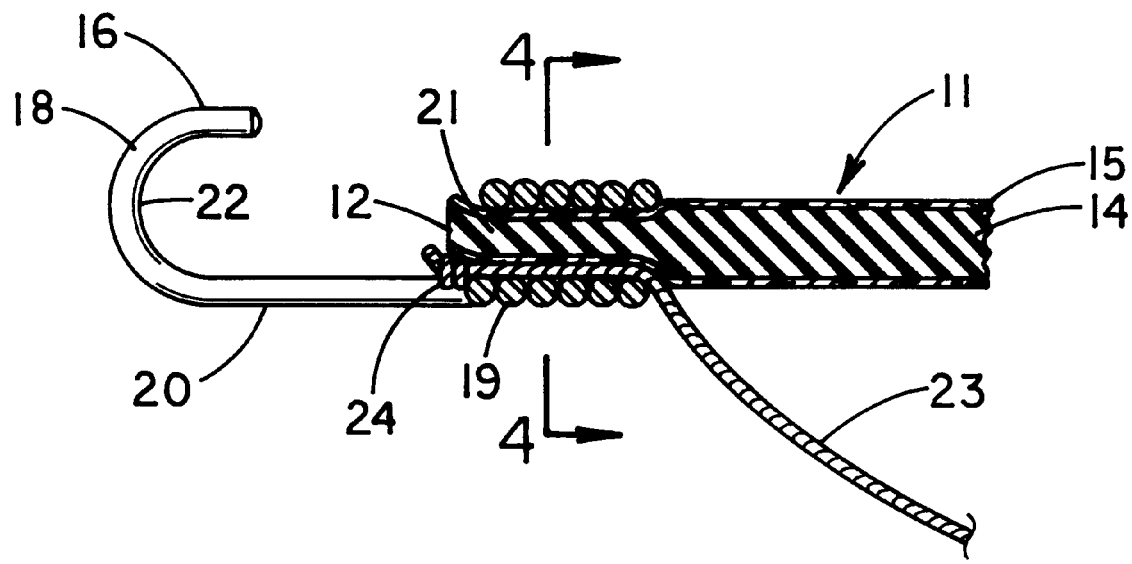
FIG. 3 is a schematic longitudinal cross section view of an end region of the present invention.

With particular reference to FIG. 3, the coiled portion of each hook is coiled around the associated adjacent end of the elastic member coaxially to the longitudinal axis of the elongate member such that each coiled member constricts a corresponding portion 21 of the elastic member adjacent the associated adjacent end of the elastic member such that the coiled portion of each hook holds the respective hook to associated adjacent end of the elastic member.

The middle portions of the hooks are outwardly extended from the associated adjacent end of the elastic member generally parallel to the longitudinal axis of the elastic member. The end portions of the hooks each have a concavity 22 facing towards the associated adjacent end of the elastic member.

An elongate inelastic flexible member (or limiting strand) 23 is also included having a pair of opposite ends, and a length defined between the ends of the flexible member. The flexible member is relatively inelastic compared to the elastic member because the elastic member has an elasticity several times greater than that of the flexible member. Preferably, the elasticity of the elastic member is at least about five times that of the flexible member.

One of the ends of the flexible member is coupled to one of the ends of the elastic member and the other of the ends of the flexible member is coupled to the other of the ends of the elastic member such that the flexible member extends between the ends of the elastic member. As best illustrated in FIGS. 3 and 4, each end of the flexible member is extended between the constricted corresponding portion of the elastic member adjacent the associated end of the elastic member and the coiled portion of the corresponding hook such that each end of the flexible member is held between the associated constricted corresponding portion of the elastic member and coiled portion of the corresponding hook.

In this preferred embodiment, each of the ends of the flexible member terminating at a stop 24 for preventing pulling out of each end of the flexible member from between the associated constricted corresponding portion and coiled portion. As illustrated in FIG. 3, ideally, each of the stops comprises a knot formed tied at the respective end of the flexible member.

Figure 2:
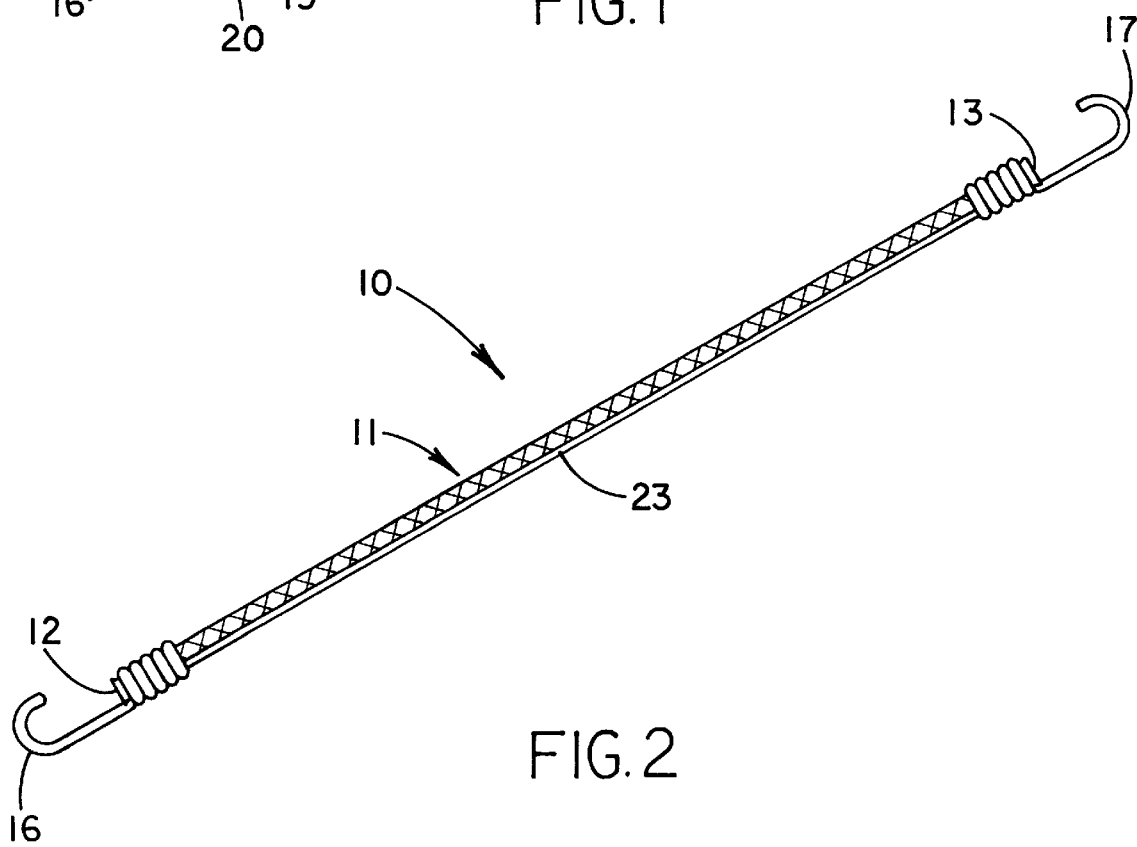
FIG. 2 is a schematic side view of the present invention with the elastic member stretched to the intermediate stretched state and the flexible member taut to prevent further stretching of the length of the elastic member.

The length of the flexible member is greater than the first length of the elastic member when in the relaxed state and less than the second length of the elastic member when the stretched state such that the flexible member is slack (as illustrated in FIG. 1) when the elastic member is in the relaxed state. In use, the flexible member limits stretching of the elastic member to an intermediate stretched state (see FIG. 2) between the relaxed state and the stretched state. The elastic member has a third length greater than the first length and less than the second length and about equal to the length of the flexible member such that the flexible member is taut (as illustrated in FIG. 2) when the elastic member is stretched to the intermediate state and thereby prevents further stretching of the elastic member towards the stretched state.

The flexible member limits the amount of potential energy that is stored in the elastic member when stretched to an amount created when the elastic member is in the intermediate state and thereby prevent excessive potential energy from is stored in the elastic member so that if the hooks is detached from their moorings on an object, the ends of the elastic member do not snap back towards each other with too severe of energy that a user may be injured when struck by the hooks. The flexible member also prevents the elastic member from snapping or breaking from excessive stretching by limiting the amount of stretching of the elastic member to the intermediate stretched state less than the stretched state.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tie down, comprising:
    an elongate elastic member having a pair of opposite ends;
    said elastic member having a relaxed stated from which said elastic member may be stretched to a stretched state, said elastic member having a first length when in said relaxed state and a second length greater than said first length when in said stretched state;
    each of said ends of said elastic member having a hook coupled thereto;
    an elongate inelastic flexible member having a pair of opposite ends, and a length defined between said ends of said flexible member;
    one of said ends of said flexible member being coupled to one of said ends of said elastic member and the other of said ends of said flexible member being coupled to the other of said ends of said elastic member;
    said length of said flexible member being greater than said first length of said elastic member and less than said second length of said elastic member;
    wherein each of said hooks has a resilient coiled portion, wherein said coiled portion of each hook is coiled around the associated adjacent end of said elastic member such that each coiled member constricts a corresponding portion of said elastic member adjacent the associated adjacent end of said elastic member such that said coiled portion of each hook holds the respective hook to associated adjacent end of said elastic member; and
    wherein each end of said flexible member is extended between the constricted corresponding portion of said elastic member adjacent the associated end of the elastic member and said coiled portion of the corresponding hook such that each end of said flexible member is held between the associated constricted corresponding portion of the elastic member and coiled portion of the corresponding hook.

2. The tie down of claim 1, wherein each of said ends of said flexible member terminates at a stop for preventing pulling out of each end of said flexible member from between the associated constricted corresponding portion and coiled portion.

3. The tie down of claim 2, wherein each of said stops comprises a knot formed at the respective end of said flexible member.

4. The tie down of claim 1, wherein said elastic member comprises an elongate elastic core and an elongate elastic sheath disposed about said elastic core to substantially cover said elastic core between said ends of said elastic member.

5. A tie down, comprising:
    an elongate elastic member having a pair of opposite ends;
    said elastic member having a relaxed stated from which said elastic member may be stretched to a stretched state, said elastic member having a first length when in said relaxed state and a second length greater than said first length when in said stretched state;
    each of said ends of said elastic member having a hook coupled thereto;
    an elongate inelastic flexible member having a pair of opposite ends, and a length defined between said ends of said flexible member;
    one of said ends of said flexible member being coupled to one of said ends of said elastic member and the other of said ends of said flexible member being coupled to the other of said ends of said elastic member;
    said length of said flexible member being greater than said first length of said elastic member and less than said second length of said elastic member; and
    wherein said elasticity of said elastic member is at least about five times that of said flexible member.

6. A tie down, comprising:
    an elongate elastic member having a pair of opposite ends and a longitudinal axis extending between said ends of said elastic member;
    said elastic member having a generally circular transverse cross section taken substantially perpendicular to said longitudinal axis of said elastic member;

said elastic member comprising an elongate elastic core and an elongate elastic sheath disposed about said elastic core to substantially cover said elastic core between said ends of said elastic member;

said elastic member having a length defined between said ends of said elastic member;

said elastic member having a relaxed stated from which said elastic member may be stretched to a stretched state, said elastic member having a first length when in said relaxed state and a second length greater than said first length when in said stretched state;

each of said ends of said elastic member having a hook coupled thereto and outwardly extending therefrom;

each of said hooks having an arcuate end portion, a resilient coiled portion and an elongate middle portion connecting said end portion to said coiled portion of the respective hook;

said coiled portion of each hook being coiled around the associated adjacent end of said elastic member such that each coiled member constricts a corresponding portion of said elastic member adjacent the associated adjacent end of said elastic member such that said coiled portion of each hook holds the respective hook to associated adjacent end of said elastic member;

said middle portions of said hooks being outwardly extended from the associated adjacent end of said elastic member generally parallel to said longitudinal axis of said elastic member;

said end portions of said hooks each having a concavity facing towards the associated adjacent end of said elastic member;

an elongate inelastic flexible member having a pair of opposite ends, and a length defined between said ends of said flexible member;

one of said ends of said flexible member being coupled to one of said ends of said elastic member and the other of said ends of said flexible member being coupled to the other of said ends of said elastic member such that said flexible member extends between said ends of said elastic member;

wherein each end of said flexible member is extended between the constricted corresponding portion of said elastic member adjacent the associated end of the elastic member and said coiled portion of the corresponding hook such that each end of said flexible member is held between the associated constricted corresponding portion of the elastic member and coiled portion of the corresponding hook;

each of said ends of said flexible member terminating at a stop for preventing pulling out of each end of said flexible member from between the associated constricted corresponding portion and coiled portion;

wherein each of said stops comprises a knot formed at the respective end of said flexible member; and said length of said flexible member being greater than said first length of said elastic member when in said relaxed state and less than said second length of said elastic member when said stretched state, said flexible member limiting stretching of said elastic member to an intermediate stretched state between said relaxed state and said stretched state wherein said elastic member has a third length greater than said first length and less than said second length and about equal to said length of said flexible member.

* * * * *